United States Patent [19]

Streck

[11] 3,985,500
[45] Oct. 12, 1976

[54] BLACK DYE FORMULATION
[75] Inventor: Clemens Streck, Loudonville, N.Y.
[73] Assignee: GAF Corporation, New York, N.Y.
[22] Filed: Aug. 21, 1974
[21] Appl. No.: 499,547

[52] U.S. Cl................................................ 8/25; 8/7
[51] Int. Cl.$^2$........................ D06P 1/00; D06P 3/00;
D06P 7/00; D21H 1/46
[58] Field of Search....................................... 8/25, 7

[56] References Cited
UNITED STATES PATENTS

| | | | |
|---|---|---|---|
| 3,097,909 | 7/1963 | Rhyner et al. | 8/25 X |
| 3,107,968 | 10/1963 | Pascal | 8/25 X |

OTHER PUBLICATIONS
"Printing Inks," by C. Ellis (1940), Reinhold Publishing Corp., pp. 350–358.

*Primary Examiner*—William F. Hamrock
*Attorney, Agent, or Firm*—Walter C. Kehm; Marilyn J. Maue

[57] ABSTRACT

This invention relates to a black dye formulation capable of high concentration in solution which imparts light fast, rich bloomy black shades found to be particularly desirable for printing and dyeing of textiles composed of cationic fibers, such as acrylics nylon, dacrons, polyesters, acetates, or mixtures thereof which formulation consists essentially of a triarylmethane dye portion and a methine dye portion combined in a ratio between about 1:1.2 and 1:2.8 and wherein the triarylmethane portion is composed of C.I. Basic Blue 1 or a mixture of C.I. Basic Blue 1 and C.I. Basic Blue 5 and the methine portion is composed of a mixture of C.I. Basic Violet 16; C.I. Basic Yellow 29 and C.I. Basic Orange 21. This novel dye formulation is prepared as a solution or liquid paste composition by diluting the above formulation with between about 25% and about 70% by weight of an inert solvent solution, which preferably contains water and a water miscible thiodialkylene glycol solvent having between 2 and 4 carbon atoms in the alkylene group. These liquid compositions may additionally contain other solvents, or additives which are conventionally incorporated in dye pastes.

17 Claims, No Drawings

BLACK DYE FORMULATION

In recent years considerably effort has been devoted to investigation and research to find a black dye formulation which produces deep rich shades when printed on a substrate and which can be retained in solution in a highly concentrated state. Additionally, black dyes which do not cause tarnishing or dulling of companion colors or white backgrounds during printing, have been the subject of much experimentation.

It is advantageous to be able to market dyes as solutions since these can be pumped and metered accurately by the manufacturer. Moreover, time is saved by dissolving the dye prior to use and dusting and caking problems normally associated with dry powder can be avoided. Since the previous black dye formulations have relatively poor solubility properties, it was necessary to use high dilution to provide such solutions. However, high dilution of the dye results in large volumes of colorant solution which adds to transportation costs and may cause problems of adequate storage capacity. Several black dye compositions are presently being marketed which provide good depth of color on printing; however, because of their limited solubility in solvents commonly used, high dilution is required to avoid precipitation. In such dilution limited state, these dyes cannot be printed in as strong a concentration as desired with the result that the black shades thereby obtained appear flat and non-bloomy. Conversely, the present dye compositions which can be concentrated in solution up to 70% or 75% by weight, provide considerably stronger fuller color when used in the same concentration in the printing of textiles as those of the prior art.

To circumvent the problem of unwanted dilution, prior formulators have increased the number and type of solvents included in the dye composition; however, this technique has failed to offer a satisfactory solution for the reason that incorporation of many types of solvents, having distinctly different $\Delta$ viscosity characteristics, causes deleterious effects in the printing paste. As a direct result, uniform consistency of the paste cannot be maintained and noticeable loss of definition in the printed design occurs with uncontrolled thinning of the paste.

The present black dye compositions not only provide for improved printing of fabrics, they are also used in the dyeing of paper. In the dyeing of paper, the dye composition can be incorporated in the beater pulp treatment prior to the formation of the sheet or it can be added in the size press application, eg. in the sizing starch solution. Alternatively, the dye composition can be sprayed onto the finished sheet and then dried. In the paper dyeing application the same concentrations of the dye formulation as employed for fabric printing can be used.

It is an object of the present invention to provide a dye composition which satisfies all of the above requirements while avoiding the difficulties referred to in the foregoing disclosure.

It is another object of the invention to provide a solution highly concentrated in a black dye formulation which has excellent sublimation and light fastness properties.

It is a further object of this invention to provide a new and improved black dye formulation.

Still another object is to provide a concentrated black dye composition capable of dyeing to a full, rich jet black bloomy shade.

Another object is to provide an improved dye for synthetic fabrics, particularly those composed of acrylic, polyester, polyamide and acetate fibers.

Still another object is to provide an improved dye composition for use in paper dyeing.

These objects and many more will become apparent to those skilled in the art from the accompanying description and disclosure.

According to the present invention, there is provided an improved black dye formulation consisting essentially of a triarylmethane dye portion and a methine dye portion in a ratio of between about 1:1.2 and 1:2.8; preferably between about 1:1.5 and about 1:2.5, in which the triaryl methane portion contains as an essential ingredient C.I. Basic Blue 1 which may or may not have admixed therewith C.I. Basic Blue 5 and in which the methine portion consists essentially of C.I. Basic Violet 16; C.I. Basic Yellow 29 and C.I. Basic Orange 21.

The triarylmethane portion of the above formulation can be varied between about 28 and 45 parts by weight, preferably between 33 and 42 parts by weight of the total formulation with Basic Blue dye which is C.I. Basic Blue 1 or mixtures thereof with up to 75%, preferably only up to 65% by weight, Basic Blue 5. The methine portion is comprised of 22 to 34 parts, preferably 25 to 35 parts by weight, of C.I. Basic Yellow 29 and 2 to 7 parts by weight C.I. Basic Orange 21, parts by weight; all parts by weight of dyes being based on the total formulation and being adjusted within the ranges to provide a total dye formulation of 100 parts by weight.

The dye formulation can prepared as a solution or paste composition by diluting the formulation with between about 25% and 70%, preferably between 40% and 65% and most preferably from 50% to 60% by weight, of a suitable polar solvent in aqueous medium.

Suitable solvents for textile dye printing are aqueous solutions of polar solvents containing a hydroxyl radical, such as the thiodialkylene glycols having between 2 and 4 carbon atoms in the alkylene group; cyclohexanol; n-hexanol and other hydroxy-containing solvents which are water miscible and soluble in the dye formulation. Of this group, the thiodialkylene glycols are preferred with thiodiethylene glycol being most desirable. Aqueous solutions of these hydroxy-containing solvents may be used alone, in intermixtures or in admixture with about 1 to 15% by weight of other solvents having a lower solubility in water, such as amino alcohols, eg. mono- or di-ethanol amines, amines or amides of 2 to 8 carbon atoms, preferably cyclic compounds such as morpholine, butyl lactate, cyclohexanone, N,N-dimethyl lauramide, etc. In preparing the present dye compositions, the aqueous solution is added to the dye formulation and stirred until a homogeneous liquid is formed. In the aqueous dye liquid systems, the ratio of solvent to water is generally maintained between about 2.8:1 and about 1:2.8. preferably between about 1.5:1 and about 1:1.5 parts by weight.

There is no critical method of forming the present dye compositions so that any order of addition for the components can be employed. Generally, the solvent or mixture of solvents is introduced to a kettle and the dye powder is added thereto under agitation, preferably at an elevated temperature. Also, a mixture of solvent and the triarylmethane portion of the dye can be prepared and this mixture added to a mixture of solvent and the methine portion of the dye formulation. In this case water can be subsequently added to meet the desired consistency specification. Many other methods of forming the present dye compositions will become apparent from standard procedures used by those skilled in the art.

The present dye formulation and solutions thereof comprising the dye compositions are formed under continuous agitation, as by constant stirring, at a temperature between ambient or room temperature and about 100° C., preferably between 40° C and 60° C until a homogeneous solution is obtained. For example, in the preparation of a 5,000 pound batch, mixing is usually complete within 2 to 6 hours.

In the above formulation, when the triarylmethane portion contains about an equivalent amount or more of C I. Basic Blue 5, a small amount, for example from 0.5 to 1.5 parts by weight (total formulation) of a weak acid, eg. acetic or propionic acid can be added to increase the solubility of the C.I. Basic Blue 5 in water. The highest concentrations of the present dye formulations of the present dye formulations in solvent are achieved with a mixture of water and thiodiethylene glycol in which the dye can be concentrated above 50% by weight; for example, up to 70% or 75% by weight. At a dye concentration of about 45% the present dye composition is comparable in color value with powder dye concentrations.

The ability to use the glycol as a single solvent in the present dye composition is distinctly advantageous for maintaining desirable paste characteristics in the printing and dyeing of fabrics. It is discovered that as a general rule, the brightness and bloom of the dyed shade is directly diminished in accordance with the number and type of solvents used in the printing paste. The present solvent mixtures are exceptions to this rule, in that an equally important advantage is achieved in the use of the solvent mixtures hereinabove defined; namely, these particular solvent mixtures permit high concentrations of dye to be dissolved therein so that, upon printing, a deep rich black shade is obtained.

Observance of the foregoing ranges for the various dye ingredients in the present formulation is critical in obtaining the full, bloomy, deep black shade of the present dyes and in realizing the excellent sublimation and light fastness properties for the compositions of the present invention. For example, the Violet 16 dye controls the redness, blueness or brightness of the composition. However, when an amount in excess of 40 parts by weight of the total dye formulation is employed, a highly undesirable reddish-black color is obtained. On the other hand, when less than 22 parts by weight of this dye in the total formulation is employed, an equally undesirable dull blue-black shade is obtained. Similarly, when the limits of the yellow component are exceeded, a greenish-black color results; whereas the use of less than 20 parts by weight of the dye formulation is employed, the resulting color lacks depth of shade and shifts to the violet spectrum. The orange dye is controlled within narrow limits which provide jetness and body to the dye of optimum desirability.

In the present invention, the pH of the dye composition is not critical and generally falls within the range of between about 2 and about 6, more often between 3 and 4.5.

As indicated hereinabove, the present dye compositions find particular application in the printing of fabrics, most specially mixed fabrics of the polyamide, nylon and/or polyester types. Any of the standard methods of printing on fabrics can be employed and include, roller printing, rotary screen printing or flast screen printing. For example in roller printing, the material to be printed is passed in a conventional manner between a pressure roller and an engraved roller, (a roller carrying the dye composition including a thickener and a fixing agent). Normally, between the pressure roller and the fabric is the back grey which serves to cushion the fabric and absorb the dye paste. Generally, this operation is carried out at a rate of between about 40 and about 120 yards per minute, more often between about 60 and 70 yards per minute at a temperature of from about ambient temperature to about 140° C. The amount of dye paste on the engraved roller is controlled by a doctor blade which wipes off excess paste fed by a feeding mechanism (eg. a color box) before contact of the roller with the fabric. This technique is merely representative of the many, equally suitable processes which can be employed with the dye compositions of the present invention.

It is to be understood that the present dye compositions can be used as printing paste and the paste can be somewhat altered by the addition of thickener, fixation agents, etc. depending upon the fabric and pattern to be printed. Generally, additives for cationic dyes such as for example Polygum 272*, citric acid, Solvacene PFD, ammonium thiocyanate, ammonium salts, or any of the other standard types can be employed. Standard fixation agents, such as for example citric acid, may be added in an amount of from 0.5% to about 5% by weight of the total dye paste.

\* a commercial thickening agent supplied by Polymer Corporation.

Having thus described the invention, reference is now directed to the following examples which serve to illustrate specific embodiments thereof and are not to be construed as limiting to the scope of the invention as defined by the accompanying claims. In the Examples all parts and proportions are by weight unless otherwise indicated. It is also to be understood that any of the above described proportions of the dye formulation and/or any of the foregoing solvents can be substituted in the following examples to provide substantially improved color results in accordance with the specifications set forth herein.

EXAMPLES 1 THROUGH 9

Nine identical samples of a dye composition are prepared by mixing nine separate dye formulations each consisting of 40 parts of C.I. Basic Blue 1; 25 parts of C.I. Basic Violet 16; 30 parts of C.I. Basic Yellow 29 and 5 parts of C.I. Basic Orange 21 in a solution comprising a 1:1 ratio of water to solvent or solvents mixture as indicated in the following Table I until a 55% by weight dilution of the dye formulation is obtained. Each of the samples are mixed at 40° C for 1 hour to form a homogeneous solution.

TABLE I

| Examples | 1 | 2 | 3 | 4 | 5 | 6 | 7 | 8 | 9 |
|---|---|---|---|---|---|---|---|---|---|
| Solvents | | | | | | | | | |
| thiodiethylene glycol | X | X | X | X | X | X | X | X | X |
| cyclohexanol | | X | X | | | | | | |
| n-hexanol | | | | X | X | | | | |
| morpholine | | | | | | X | | | |
| N,N-dimethyl lauramide | | | | | | | | X | |
| butyl lactate | | | | | | | | | X |

TABLE I-continued

| Examples | 1 | 2 | 3 | 4 | 5 | 6 | 7 | 8 | 9 |
|---|---|---|---|---|---|---|---|---|---|
| cyclohexanone | | | | | | | | | x |

To each of the above dye compositions (8 parts by weight sample) is added a mixture of 50 parts by weight of Polygum 272 in 8% concentration, 38 parts by weight of water and 4 parts by weight ammonium sulfate. The resulting mixture is stirred for 1 hour to provide a printing paste for printing fabric. Each of the nine dye paste samples is successively tested on a printing machine by continuously applying the dye paste sample to the printing roller which is engraved with a broad 2 inch strip flanked by two 1/16 inch strips and the excess paste is continuously removed with a doctor blade.

Nine white orlon samples, cut from the same bolt of material, are then passed through the printing machine to test each of the dye paste compositions. The fabric is passed through the machine at a rate of 60 yards/minute at a temperature of 32° C. Nine printed orlon samples are thus obtained and dried. After drying, the printed fabric is exposed to neutral steam for 20 minutes at atmospheric pressure. In each of the nine printed samples, a full, jet-black bloomy shade of strong intensity with sharp design definition is obtained. The dried orlon samples show no signs of tarnishing in the white unprinted portions of the fabric.

Each of the nine orlon samples is then exposed for 10 hours on the Fadeometer after which they show no signs of fading. Excellent sublimation and wash fastness properties are obtained for each of the nine printed samples.

EXAMPLE 10

Thiodiethyleneglycol (31.8 gms.) and glacial acetic acid (1.0 gm.) are combined with water at 60° C. C.I. Basic Blue 1 (5.8 gms.), C.I. Basic Blue 5 (8.6 gms.), C.I. Basic Violet 16 (10.5 gms.), C.I. Basic Yellow 29 (10.6 gms.) and C.I. Basic Orange 21 (1.7 gms.) are added to the solution under agitation. Stirring is continued until a uniform solution is obtained. This mixture dyes acetate, nylon and acrylics a stronger jet-black shade than Genacryl Black BC powder; a commonly used mixture consisting of C.I. Basic Yellow 11, C.I. Basic Blue 1 and C.I. Basic Violet 16, dissolved in water.

EXAMPLE 11

A print paste is prepared by adding 4 gms. of the black liquid dye of Example 10 to a mixture of thiodiethyleneglycol (3 gms.) hot water (38 gms.), polygum 272 (50 gms. of 8%) and citric acid (5 gms.). Acetate satin printed with this paste is faster to sublimation and light than that printed with a paste prepared in the same manner from Genacryl Black BC powder. The print is neutralaged for 20 minutes at 10 pounds of pressure and washed in the usual manner.

EXAMPLES 12 THROUGH 22

The modified formulations of Table II are produced according to the method of Example 10. The print pastes prepared from these formulations are more fluid than that from the formulation of Example 10 and allow for somewhat better fabric penetration.

TABLE II

| | 12 | 13 | 14 | 15 | 16 | 17 | 18 | 19 | 20 | 21 | 22 |
|---|---|---|---|---|---|---|---|---|---|---|---|
| water | 30.0 | 10.0 | — | — | 30.0 | 11.8 | — | 10.0 | 10.0 | 10.0 | 10.0 |
| thiodiethyleneglycol | 10.0 | 20.0 | 30.0 | 31.8 | 10.0 | 30.0 | 35.0 | 21.8 | 21.8 | 21.8 | 21.8 |
| cyclohexanol | 21.8 | 31.8 | 31.8 | — | — | — | — | — | — | — | — |
| n-hexanol | — | — | — | 30.0 | 21.8 | 20.0 | 26.8 | — | — | — | — |
| glacial acetic acid | 1.0 | 1.0 | 1.0 | 1.0 | 1.0 | 1.0 | 1.0 | 1.0 | 1.0 | 1.0 | 1.0 |
| morpholine | — | — | — | — | — | — | — | 30.0 | — | — | — |
| Hallcomid M-12** | — | — | — | — | — | — | — | — | 30.0 | — | — |
| butyl lactate | — | — | — | — | — | — | — | — | — | 30.0 | — |
| cyclohexanone | — | — | — | — | — | — | — | — | — | — | 30.0 |
| C.I. Basic Blue 1 | 5.8 | 5.8 | 5.8 | 5.8 | 5.8 | 5.8 | 5.8 | 5.8 | 5.8 | 5.8 | 5.8 |
| C.I. Basic Blue 5 | 8.6 | 8.6 | 8.6 | 8.6 | 8.6 | 8.6 | 8.6 | 8.6 | 8.6 | 8.6 | 8.6 |
| C.I. Basic Violet 16 | 10.5 | 10.5 | 10.5 | 10.5 | 10.5 | 10.5 | 10.5 | 10.5 | 10.5 | 10.5 | 10.5 |
| C.I. Basic Yellow 29 | 10.6 | 10.6 | 10.6 | 10.6 | 10.6 | 10.6 | 10.6 | 10.6 | 10.6 | 10.6 | 10.6 |
| C.I. Basic Orange 21 | 1.7 | 1.7 | 1.7 | 1.7 | 1.7 | 1.7 | 1.7 | 1.7 | 1.7 | 1.7 | 1.7 |

**N,N-dimethyl lauramide by C. P. Hall Co.

EXAMPLE 23

C.I. Basic Violet 16 (9.6 gms.), C.I. Basic Yellow 29 (10.9 gms.), C.I. Basic Orange 21 (2.0 gms.), and C.I. Basic Blue 1 (12 gms.) are added to a solution of thiodiethyleneglycol (30.0 gms.) and water (36.40 gms.) The mixture is stirred until the dyes are dissolved.

Acetate fabric printed with this mixture in the manner of Example 1 is faster to sublimation than that dyed with Genacryl Black BC powder.

EXAMPLE 24

Beater Dyeing of Paper

A paper pulp is prepared by mixing in a beater equal amounts of beaten unbleached sulfite pulp and unbleached ground wood pulp and after a uniform mixture is obtained, forming a pulp mixture by draining the mixture of excess liquid to 10% solids content. Thirty gms. of the pulp mixture is then diluted with 50cc of distilled water in a 1000cc stainless steel beaker and stirred. To the stirred mixture is added 25cc of an aqueous solution of 1 gram of the dye composition of Example 1 diluted in 1000 cc of water. After stirring for about 1 minute, 2% by weight of rosin size is added and after further stirring for about 1 minute, 2.5% alum (potassium aluminum sulfate) is added to the mixture. After about 10–15 minutes of constant mixing, a hand sheet is made by pouring the mixture on a vacuum filter screen, removing the formed paper mat from the screen, removing excess liquid by a press and drying on a heated drum.

The dried paper sample is dyed a deep black shade which is more intense than that obtained with a sample similarly prepared where Genacryl Black BC powder is substituted for the dye composition of Example I.

EXAMPLE 25

Surface Dyeing Of Paper

A preformed sheet of filter paper is passed through a solution prepared by mixing 1 gram of the dye composition of Example 1 and 100cc of distilled water. The black dyed paper sheet is then dried at about 50° C. Although it is to be understood that any conventional drying temperature, i.e. from room temperature up to 150° C, can be used. The dried sheet is dyed to a deep black shade which is more intense than that obtained with a sample similarly prepared from Genacryl Black BC powder instead of the dye composition of Example 1.

Having thus described my invention, I claim:

1. A black dye formulation consisting essentially of a triarylmethane dye portion and a methine dye portion combined in a ratio of between about 1:1.2 and about 1:2.8 and wherein the triarylmethane portion is composed of C.I. Basic Blue 1 or a mixture of C.I. Basic Blue 1 and C.I. Basic Blue 5 and the methine portion is composed of a mixture of C.I. Basic Violet 16; C.I. Basic Yellow 29 and C.I. Basic Orange 21.

2. The dye formulation of claim 1 wherein the triarylmethane portion contains between about 28 and about 45 parts by weight of C.I. Basic Blue 1 or a mixture of C.I. Basic Blue 1 and up to 75% of C.I. Basic Blue 5; and the methine portion contains between about 22 and about 34 parts by weight of C.I. Basic Violet 16; between about 20 and about 40 parts by weight of C.I. Basic Yellow 29 and between about 2 and about 7 parts by weight of C.I. Basic Orange 21.

3. The dye formulation of claim 2 wherein the triarylmethane portion is C.I. Basic Blue 1.

4. The dye formulation of claim 1 wherein the formulation is diluted with between about 25% and about 75% of an aqueous solution of an inert solvent to form a dye composition.

5. The dye composition of claim 4 wherein the formulation is diluted with a polar, solvent solution containing an aqueous solution of a hydroxy-compound.

6. The dye composition of claim 5 wherein the ratio of solvent to water is between about 2.8:1 and about 1:2.8.

7. The dye composition of claim 5 wherein the polar solvent is a thiodialkylene glycol wherein the alkylene group contains from 2 to 4 carbon atoms.

8. The dye composition of claim 7 wherein the thiodialkylene glycol is thiodiethylene glycol.

9. The dye composition of claim 5 wherein the hydroxy-containing compound in the aqueous solution is admixed with at least one solvent selected from the group consisting of an aliphatic amine having from 2 to 8 carbon atoms including cycloamines, an aliphatic amide having from 2 to 8 carbon atoms including cycloamides, an aliphatic amino alcohol having from 2 to 8 carbon atoms, an aliphatic amido alcohol containing 2 to 8 carbon atoms, cyclohexanone, cyclohexanol, n-hexanol, morpholine, and N,N-dialkyl lauramide wherein the alkyl groups each contain from 1 to 6 carbon atoms.

10. The dye composition of claim 9 wherein the triarylmethane portion of the dye formulation is a mixture of C.I. Basic Blue 1 and C.I. Basic Blue 5 and the composition contains from 0.5 to 1.5 parts by weight of a weak acid.

11. The dye formulation of claim 1 wherein the triarylmethane portion contains between about 33 and about 42 parts by weight of C.I. Basic Blue 1 or a mixture of C.I. Basic Blue 1 and up to 65% C.I. Basic Blue 5; and the methine portion contains between about 25 and about 30 parts by weight of C.I. Basic Violet 16, between about 25 and about 35 parts by weight of C.I. Basic Yellow 29 and between about 2 and about 7 parts by weight C.I. Basic Orange 21.

12. The dye formulation of claim 11 wherein the formulation is diluted with between about 40% and about 65% of an aqueous solution of inert polar solvent to form a dye composition.

13. The dye composition of claim 12 wherein the inert polar solvent solution contains at least one solvent selected from the group consisting of thiodialkylene glycol in which the alkylene group has from 2 to 4 carbon atoms; cyclohexanol; n-hexanol; an aliphatic amine having from 2 to 8 carbon atoms, including cycloamines; an aliphatic amide having from 2 to 8 carbon atoms, including cycloamides; an aliphatic amino alcohol having from 2 to 8 carbon atoms; an aliphatic amide alcohol having from 2 to 8 carbon atoms; cyclohexanone; morpholine and N,N-dialkyl lauramide wherein the alkyl groups each contain from 1 to 6 carbon atoms; and wherein at least one of the solvent components is a hydroxy-containing compound.

14. The dye composition of claim 13 wherein the inert polar solvent solution contains thiodiethylene glycol and an alcohol.

15. The dye composition of claim 13 wherein the triarylmethane portion of the dye is C.I. Basic Blue 1 and the inert polar solvent solution contains at least a major portion of thiodiethylene glycol.

16. A printing paste composition suitable for printing on a fabric comprising the dye composition of claim 4 and between about 1% and about 15% by weight of thickener to form the dye paste.

17. A dye composition suitable for dyeing paper comprising the dye composition of claim 4.

* * * * *